United States Patent
Kelly-Rowley et al.

(10) Patent No.: US 6,808,556 B2
(45) Date of Patent: Oct. 26, 2004

(54) BRANCHED ALCOHOLS AND DIOLS FOR INCREASED DOT SIZE AND RELIABILITY

(75) Inventors: Ann M. Kelly-Rowley, San Diego, CA (US); Amiya K. Chatterjee, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 10/000,043

(22) Filed: Oct. 29, 2001

(65) Prior Publication Data

US 2003/0079649 A1 May 1, 2003

(51) Int. Cl.⁷ .............................................. C09D 11/02
(52) U.S. Cl. ................... 106/31.58; 106/31.86
(58) Field of Search ............................ 106/31.58, 31.86

(56) References Cited

U.S. PATENT DOCUMENTS

| | | |
|---|---|---|
| 5,154,761 A | 10/1992 | Cooke et al. |
| 5,302,197 A | 4/1994 | Wickramanayke et al. |
| 5,364,461 A * | 11/1994 | Beach et al. ............. 106/31.58 |
| 5,428,383 A | 6/1995 | Shields et al. |
| 5,534,051 A | 7/1996 | Lauw |
| 5,541,633 A | 7/1996 | Winnik et al. |
| 5,766,327 A | 6/1998 | Maze |
| 5,788,754 A | 8/1998 | Deardurff et al. |
| 5,858,075 A * | 1/1999 | Deardurff et al. ......... 106/31.27 |
| 5,955,515 A * | 9/1999 | Kimura et al. .............. 523/161 |
| 5,981,623 A * | 11/1999 | McCain et al. ............. 523/160 |
| 6,187,086 B1 * | 2/2001 | Rehman ................... 106/31.86 |
| 6,372,818 B1 * | 4/2002 | Kimura et al. .............. 523/161 |
| 6,379,441 B1 * | 4/2002 | Kanaya et al. ........... 106/31.49 |
| 6,511,170 B1 * | 1/2003 | Gallo et al. ................ 347/100 |

FOREIGN PATENT DOCUMENTS

| | | |
|---|---|---|
| EP | 0 562 732 | 5/1996 |
| EP | 1 041 127 | 10/2000 |
| EP | 1 203 798 | 5/2002 |
| JP | 07032726 | 2/1995 |

* cited by examiner

Primary Examiner—Mark L. Bell
Assistant Examiner—Veronica F. Faison
(74) Attorney, Agent, or Firm—Michael O. Jones

(57) ABSTRACT

The inks provide excellent ink-jet prints having excellent imaging onto glossy inkjet media with increased dot size leading to improved dot visibility and banding robustness of the image. The aqueous inks each comprise from about 0.1 to about 20 wt % of at least one colorant (CMYK) with the black ink comprising from about 0.5 to about 20 wt % of at least one colorant; from about 7 to about 20 wt % of at least one 1,2-diol, from about 0.5% to about 2 wt % of a mono- or di-hydric alcohol; 0 to about 1.5 wt % of at least one component independently selected from the group consisting of buffers, biocides, and metal chelators; and the balance water. The formulations are substantially free of surfactants and other solvents.

18 Claims, No Drawings

BRANCHED ALCOHOLS AND DIOLS FOR INCREASED DOT SIZE AND RELIABILITY

FIELD OF THE INVENTION

The present invention generally relates to ink-jet printing, and in particular to a specific ink formulation for photo printing. This ink formulation provides for improved ink-jet print quality.

BACKGROUND OF THE INVENTION

Inkjet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers. Notwithstanding their recent success, intensive research and development efforts continue toward improving ink-jet print quality. A surge in interest in ink-jet printing especially in the area of photographic printing has resulted in the need to produce high quality prints at a reasonable cost. The challenge remains to further improve the print quality of ink-jet prints. The emerging use of ink-jet prints for digital photos, requires high-resolution images that have accurate color, are durable, and do not show banding of colors.

Color ink-jet printers, such as a DesignJet® printer available from Hewlett-Packard Company, typically use three inks of differing hues: magenta, yellow, and cyan, and optionally black. The particular set of colorants, e.g., dyes, used to make the inks is called a "primary dye set." A spectrum of colors, e.g., secondary colors, can be generated using different combinations of the primary dye set. In printing processes such as lithography, dye transfer, and some types of thermal transfer, it is possible to vary spot size so that less is demanded of the primary colored inks when producing a good secondary color. When the color inks are used in a binary printing device, that is, one in which a dot of color is either present or absent, e.g., a thermal ink-jet printer, the ability of the primaries to give recognizable secondary colors is even more important. When such device is to be used for printing images that will also be printed and compared to images printed by other modalities such as offset presses or dye sublimation printers, it is important that the colors produced by the inkjet printer are capable of encompassing and matching commonly accepted industry color descriptions, such as the color gamut (color space) for a Kodak Duralife® silver halide print. If such ink is to be used in an ink-jet printing device, characteristics such as crusting, long-term stability, and materials compatibility must also be addressed. If the ink is to be used in a thermal ink-jet printer, the further constraint of being thermally stable (kogation-resistant) is added.

In general, a successful ink set for color ink-jet printing must be compatible with the ink-jet pen and the printing system. Some of the required properties for the ink-jet ink include: good crusting resistance, good stability, the proper viscosity, the proper surface tension, little color-to-color bleed, rapid dry time, no deleterious reaction with the printhead components, high solubility of the dyes in the vehicle, consumer safety, low strike through, high color saturation, good dot size which affects the banding, and suitable color characteristics.

Inks are known which possess one or more of the foregoing properties. However, few inks are known that possess all the foregoing properties, since an improvement in one property often results in the degradation of another property. Thus, many inks used commercially represent a compromise in an attempt to achieve an ink evidencing at least an adequate response in each of the foregoing considerations. For example, inks are known which can obtain the color gamut of silver halide prints, such as those used obtained in photographic prints, but cannot obtain the smooth appearance of non-banding of such silver halide prints. Accordingly, investigations continue into developing ink formulations which have improved properties and which do not improve one property at the expense of the others. Thus, there remains a need in the art to further improve the print quality, color gamut, and banding properties of the ink-jet prints without sacrificing pen performance and reliability, particularly when trying to reproduce the color gamut of silver halide prints.

SUMMARY OF THE INVENTION

In accordance with the invention, inks suitable for use in ink-jet inks and method for formulating the same are provided. It has been found that a synergy can be produced by the combination of certain branched alcohols or diols with 1,2-diols containing a polar head group and a non-polar region. This combination provides a basis for an ink formulation that provides for good photo print attributes, especially good dot size which results in a non-banded appearance of the printed image, with improved reliability. Alcohols and diols have often been added to ink vehicles as humectants to reduce crusting in inks. However, humectants often increase the viscosity of the ink and hurt the dot size of the resultant ink. The synergy present between the selected alcohols or diols and the 1,2-diols results in higher reliability and increased dot size, a powerful combination. This formulation works best with glossy, coated paper mediums as compared to plain paper mediums. Further, this combination allows for a surfactant-free formulation. In fact, a preferred embodiment herein is an ink formulation substantially free of surfactants or other organic or inorganic solvents besides the alcohol or diol/1,2-diol combination.

In the practice of this invention, yellow, cyan, and magenta aqueous inks each comprise from about 0.1 to about 20 wt % of at least one colorant in the color ink formulations; with black ink comprising from about 1 to about 20 wt % of at least one black colorant in the black ink formulations; from about 0.5 to about 2.0 wt % of at least one mono- or di-hydric alcohol, and from about 7 to about 20 wt % of at least one 1,2-diol having a suitable hydrophile-lipophile balance (HLB). Additionally other independently selected ingredients can be added including those from the group consisting of buffers, biocides, and metal chelators; and the balance water.

The present ink compositions offer good dot size which results in a non-banded appearance of the printed image and are reliable in an ink-jet printing engine.

DETAILED DESCRIPTION OF THE INVENTION

While the specification concludes with claims particularly pointing out and distinctly claiming that which is regarded as the present invention, the advantages of this invention can be more readily ascertained from the following description of the invention.

All concentrations herein are in weight percent of total ink composition unless otherwise indicated. The purity of all components is that employed in normal commercial practice for ink-jet inks.

Colorants

In the practice of this invention, yellow, cyan, and magenta aqueous inks each comprise from about 0.1 to about 20 wt % of at least one colorant in the color ink formulations, with black ink comprising from about 1 to about 20 wt % of at least one black colorant in the black ink formulations. The dye set of the present invention may optionally include a black ink. The black ink can also be a composite of the three primary colors, yellow, cyan, and magenta.

Dyes—Dyes, whether water-soluble or water-insoluble, may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow. Any dye available and compatible with the other formulated ingredients of this invention may be used as colorants.

Vehicle

The inks of the present invention comprise an aqueous vehicle comprising the following components (in wt % of total ink composition): from about 0.5 to about 2.0, preferably from about 1 to about 2, wt % of at least one mono- or di-hydric alcohol, and from about 7 to about 20, preferably from about 7 to about 11, more preferably from about 8.5 to about 9.5, wt % of at least one 1,2-diol having a suitable hydrophile-lipophile balance (HLB). Because of solubility limitations, the more preferred 1,2-diol is 1,2 hexanediol. Additionally other independently selected ingredients can be added, each in an amount ranging of up to 3% (from 0 to about 3%) by wt, including those from the group consisting of buffers, biocides, and metal chelators; and the balance water.

Alcohol: Any mono- or di-hydric, straight or branched chain alcohol of C5–C10 chain length can be used.

1,2-Diol: The diols of this invention preferably have a 1,2-diol polar side and a hydrophobic side of 4 to 6 carbons. Thus, the diols of this invention are 1,2-hexanediol, 1,2-heptanediol, and 1,2-octanediol, preferably 1,2 hexanediol.

The formulation is substantially free of surfactants or other organic solvents. By "substantially free" is meant that no conventional surfactant is added; thus, less than about 0.1%, preferably less than 0.01% is present. The alcohol/diol combination itself provides the necessary surface activity.

Buffer: The inks of the present invention optionally comprise 0 to about 3 wt % buffer. More preferably, the inks comprise from about 0.1 to about 0.5 wt % buffer, with a concentration from about 0.1 to about 0.3 wt % being the most preferred.

Buffers employed in the practice of the invention to modulate pH can be organic-based biological buffers or inorganic buffers, preferably, organic-based. Further, the buffers employed should maintain a pH ranging from about 3 to about 9 in the practice of the invention, preferably about 6.5 to about 8 and most preferably from about 7.2 to 7.8. Examples of preferably-employed buffers include Trizma Base, available from companies such as Aldrich Chemical (Milwaukee, Wis.), 4-morpholineethanesulfonic acid (MES), b-hydroxy-4-morpholinepropanesulfonic acid (MOPSO), and 4-morpholinepropanesulfonic acid (MOPS). Most preferably, MOPS is employed in the practice of the invention.

Metal Chelator: The inks of the present invention optionally comprise 0 to about 3 wt % metal chelator. More preferably, the inks comprise from about 0.1 to about 0.5 wt % metal chelator, with a concentration from about 0.1 to about 0.3 wt % being the most preferred.

Metal chelators employed in the practice of the invention are used to bind metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind metal cations. More preferably, EDTA, and DTPA; and most preferably EDTA in its disodium salt form is employed in the practice of the invention.

Biocide: The inks of the present invention optionally comprise 0 to about 3 wt % biocide. More preferably, the inks comprise from about 0.1 to about 0.5 wt % biocide, with a concentration from about 0.1 to about 0.3 wt % being the most preferred.

Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide. The specific ink set disclosed herein is expected to find commercial use in ink-jet color printing.

EXAMPLES

Inks were formulated and different properties of the formulated inks were measured in an effort to assess the benefits attained in the practice of the invention, namely, effect of dot size on glossy, photo quality paper.

Example I

Print Sample Generation Method

The print media used included one or more of the following: uncoated paper such as HP colorfast photo paper C7013A, available from Hewlett-Packard Company, Palo Alto, Calif.; and glossy coated paper media such as HP C6034A available from Hewlett-Packard Company.

Exemplary aqueous vehicle for the ink sets comprised:

| Reference 1 Vehicle | | |
| --- | --- | --- |
| Component | Preferred Component | Quantity |
| 1,2-Diol | 1,2-hexanediol | 10% |
| Mono- or Di-hydric | Neopentyl Alcohol | 0.5% |

-continued

Reference 1 Vehicle

| Component | Preferred Component | Quantity |
|---|---|---|
| Alcohol | | |
| Buffer | MOPS | 0.15% |
| Metal chelator | EDTA | 0.10% |
| Biocide | Proxel GXL | 0.20% |
| Black dye | PRB31 | 1.5% |
| Water | | Balance |

Reference 2 Vehicle

| Component | Preferred Component | Quantity |
|---|---|---|
| Humectant 1 | Glycerol | 8% |
| Dihydric Alcohol | Ethylene Glycol | 5% |
| Surfactant | Surfynol 465 | 0.1% |
| Humectant 2 | EDPD | 8% |
| Biocide | Proxel GXL | 0.20% |
| Black dye | PRBK31 | 4.6% |
| Water | | Balance |

TABLE 1

Dot Size of Black Inks

| Alcohol Added Replacing the NPA in Reference Vehicle 1 | % added | Dot size on Glossy coated media (microns) | Standard deviation |
|---|---|---|---|
| 3,3-Dimethyl-1-Butanol | 0.75 | 121 | 12 |
| 2-Ethyl-1-butanol | 0.75 | 129 | 32 |
| 2-Methyl-1-pentanol | 0.75 | 125 | 38 |
| 3-Methyl-1-pentanol | 0.75 | 125 | 26 |
| 4-Methyl-1-pentanol | 0.75 | 85 | 8 |
| Hexyl Alcohol | 0.75 | 101 | 14 |
| 1-Heptanol | 0.75 | 120 | 18 |
| 3,5-Dimethyl-1-hexyn-3-ol | 0.5 | 103 | 10 |
| 1-Butoxy-2-propanol | 0.5 | 81 | 9 |
| Tert-Amyl Alcohol | 0.75 | 88 | 10 |
| 2-Ethyl-1-Hexanol | 0.5 | 104 | 12 |
| 1-Octanol | 0.5 | 129 | 25 |
| 2,2,4-Trimethyl-1,3-propanediol | 2 | 92 | 8 |
| 2-Butyl-2-ethyl-1,3-propanediol | 2 | 83 | 8 |
| Neopentylglycol | 2 | 135 | 45 |
| 1,2 Octanediol | 2 | 98 | 10 |
| 1,2-Decanediol | 1.5 | 97 | 19 |
| 2,2,4-Trimethyl-1-pentanol | 0.5 | 110 | 18 |
| Reference 1 same vehicle with 0.5 Neopentyl Alcohol | 0 | 84 | 13 |
| Reference 2 high humectant vehicle | 0 | 40 | 1 |

Humectant vehicle ink (Bottom of table, Reference 2) has poor spreading ability on glossy coated media. The dot size is small. Reference 1 vehicle with 10% 1,2-hexanediol has much improved spreading ability over Reference 2 vehicle, but the dot size still needs to be bigger. In addition, BINO (Bubble induced nozzle outs) occur without the high humectant co-solvents of Reference 2. What is needed is an additive that improves dot size on photo-like, glossy coated media while retaining robustness to BINO.

Table 1 shows the dot size obtainable by exchanging the 0.5 neopentyl alcohol in Reference 1 with the indicated mono- or di-hydric alcohols listed. The resultant dot size is as indicated. As shown above, the hydrophobic alkyl chains of the selected alcohols (Table 1) interact synergistically with the 1,2-hexanediol in the Reference 1 vehicle. The interaction varies with the length and branching of the alcohol hydrophobic chain. This synergy has the effect of making the vehicle even more hydrophobic on the surface of the media, and acts to spread across the media. The spreading vehicle carries the dye colorant to give larger dot size.

Example II

In the experiment with results shown in Table 2, below, humectants (ethylhydroxy-propanediol and glycerol) were added to Vehicle 1 to increase reliability. In all cases, BINO is reduced to zero; thus, all inks are found to be reliable. However, as shown, the dot size is negatively impacted in almost all cases. The dot size is shown to decrease with increasing viscosity. In the last example, NPA (neopentyl alcohol) is removed and is replaced by a low level of NPG (neopentyl glycol). In this case, NPG is able to act as both the humectant and the spreading agent through a synergistic interaction with the 1,2 HDO (1,2 hexanediol) in this vehicle. Because hydrophobic/hydrophilic interactions are taking place, the NPG is a much more effective humectant as well. That is 2% added NPG is as effective in elimination of BINO as 5% added EHPD (ethylhydroxy-propanediol) or glycerol. Since it is more effective, less is used. The viscosity is kept low, and the dot size can be larger than the Vehicle 1 example even as the humectant has been added to give good reliability. As shown, if 5% NPG were necessary, the dot size would be negatively impacted. Other humectants could also be used in this manner as long as they have the correct balance of hydrophobic/hydrophilic portions to interact with the 1,2 diol.

TABLE 2

| Humectant added | % added | Dot size on glossy coated media (microns) | Solution viscosity at 60 rpm |
|---|---|---|---|
| Vehicle 1 | 0 | 77 | 1.53 |
| Vehicle 1 + EHPD | 5 | 54 | 1.88 |
| Vehicle 1 + Glycerol | 5 | 65 | 1.80 |
| Vehicle 1 + neopentyl glycol | 5 | 59 | 1.89 |
| Vehicle 1 + NPG | 2 | 84 | 1.67 |
| Vehicle 1 − NPA + NPG | 2 | 84 | 1.62 |

What is claimed is:

1. An ink jet ink compositions for inkjet printers comprising one or more mono- or di-hydric alcohols and one or more 1,2-diols wherein said compositions is substantially free of surfactants and wherein said alcohol is a straight or branched chain alcohol of C5–C10 chain length.

2. An ink composition according to claim 1 wherein said ink is also substantially free of other organic solvents.

3. An ink composition according to claim 1 wherein said ink further comprises from about 0.1 to about 20 wt % of at least one colorant in the color ink formulations selected from the group comprising cyan, magenta, and yellow.

4. An ink composition according to claim 1 wherein said ink further comprises from about 1 to about 20 wt % of at least one black colorant in the black ink formulation.

5. An ink composition according to claim 1 wherein said mono- or di-hydric alcohol is present in a range of from about 0.5 to about 2.0 wt % of said composition.

6. An ink composition according to claim 1 wherein said 1,2-diol is present in a range of from about 7 to about 20 wt % of said composition.

7. An ink composition according to claim 1 further comprising ingredients selected from the group of buffers, biocides, metal chelators, and mixtures thereof.

8. An ink composition according to claim 5 wherein said mono- or di-hydric alcohol is present in a range of from about 1 to about 2.0 wt % of said composition.

9. An ink composition according to claim 5 wherein said alcohol is a monohydric alcohol.

10. An ink composition according to claim 6 wherein said 1,2-diol is present in a range of from about 7 to about 11 wt % of said composition.

11. An ink composition according to claim 10 wherein said 1,2-diol is present in a range of from about 8.5 to about 9.5 wt % of said composition.

12. An ink composition according to claim 1 further comprising up to about 3% each by wt of ingredients selected from the group consisting of buffers, biocides, metal chelators, and mixtures thereof.

13. An ink composition according to claim 1 wherein said 1,2-diol comprises a 1,2-diol having a polar side and a hydrophobic side of 4 to 6 carbons.

14. An ink composition according to claim 13 wherein said 1,2-diol is selected from the group consisting of 1,2-hexanediol, 1,2-heptanediol, 1,2-octanediol, and mixtures thereof.

15. An ink composition according to claim 13 wherein said 1,2-diol is 1,2 hexanediol.

16. A method of inkjet printing comprising ejection of an ink composition onto a paper media by means of an inkjet printer, wherein a) said ink composition comprises one or more mono- or di-hydric alcohols and one or more 1,2-diols, wherein said alcohol is a straight or branched chain alcohol of C5–C10 chain length and wherein said composition is substantially free of surfactants; and wherein b) said paper media is a glossy, coated paper media.

17. A method of inkjet printing according to claim 16, wherein said method provides for an improved dot size resulting in a decrease in banding of the ink image on the printed media.

18. A method for improving the reliability of inkjet printing by reducing the frequency of nozzle outs caused by bubbles (BINO) while increasing the dot size of ejected fluid from the ink jet printer, said method comprises ejection of an ink composition onto a paper media by means of an inkjet printer, wherein a) said ink composition comprises one or more mono- or di-hydric alcohols wherein said alcohol is a straight or branched chain alcohol of C5–C10 chain length and one or more 1,2-diols and wherein maid composition is substantially free of surfactants; and wherein b) said paper media is a glossy, coated paper media.

* * * * *